L. H. COOKE.
THEODOLITE, &c.
APPLICATION FILED MAR. 17, 1906.
943,063.
Patented Dec. 14, 1909.
4 SHEETS—SHEET 2.
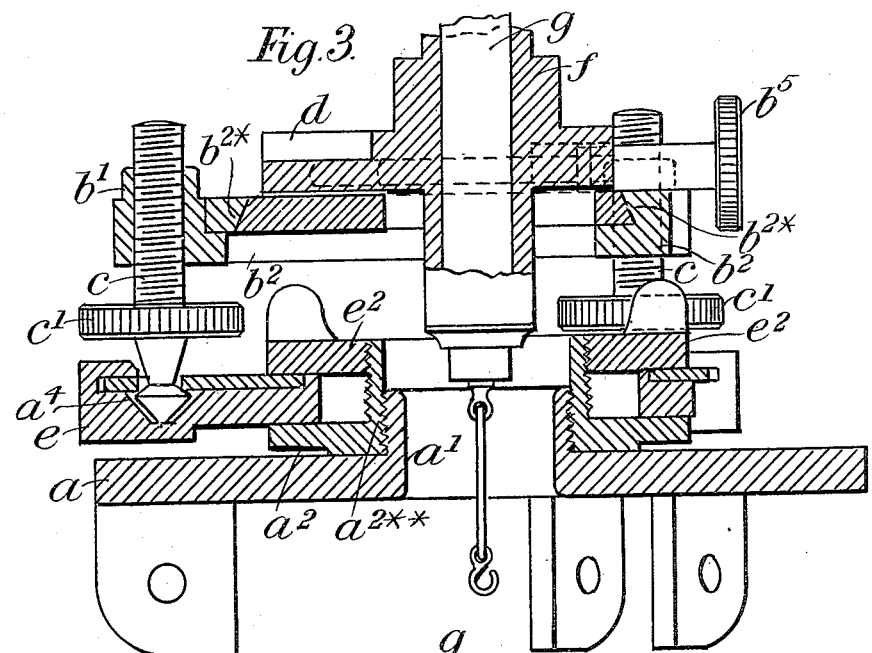
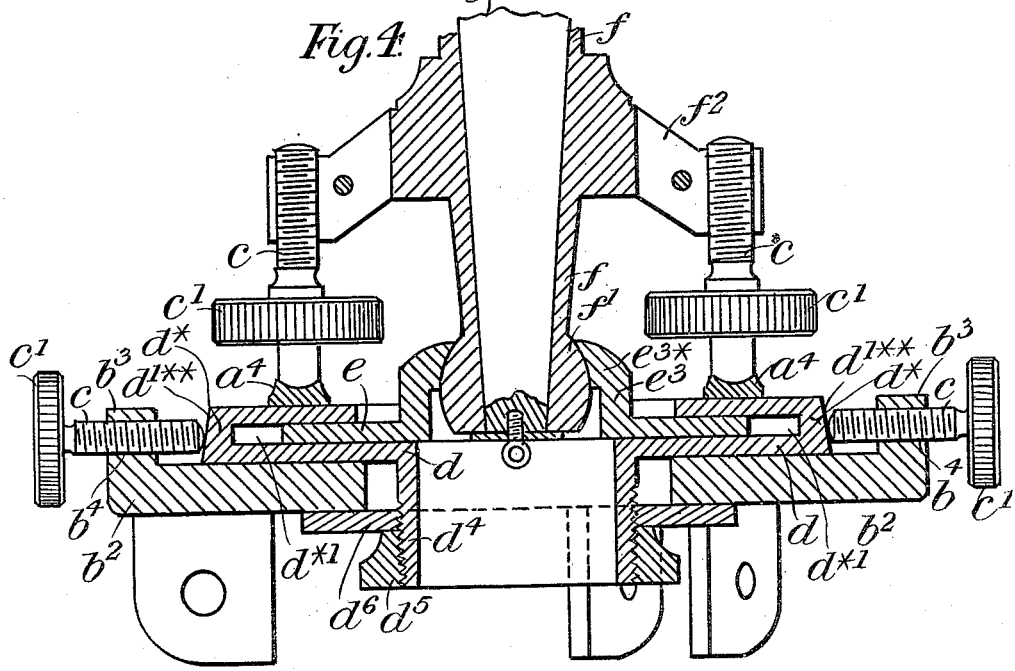
Witnesses
J. M. Wynkoop
H. A. Totten
Inventor
Lewis Henry Cooke
by Knight Bros attys

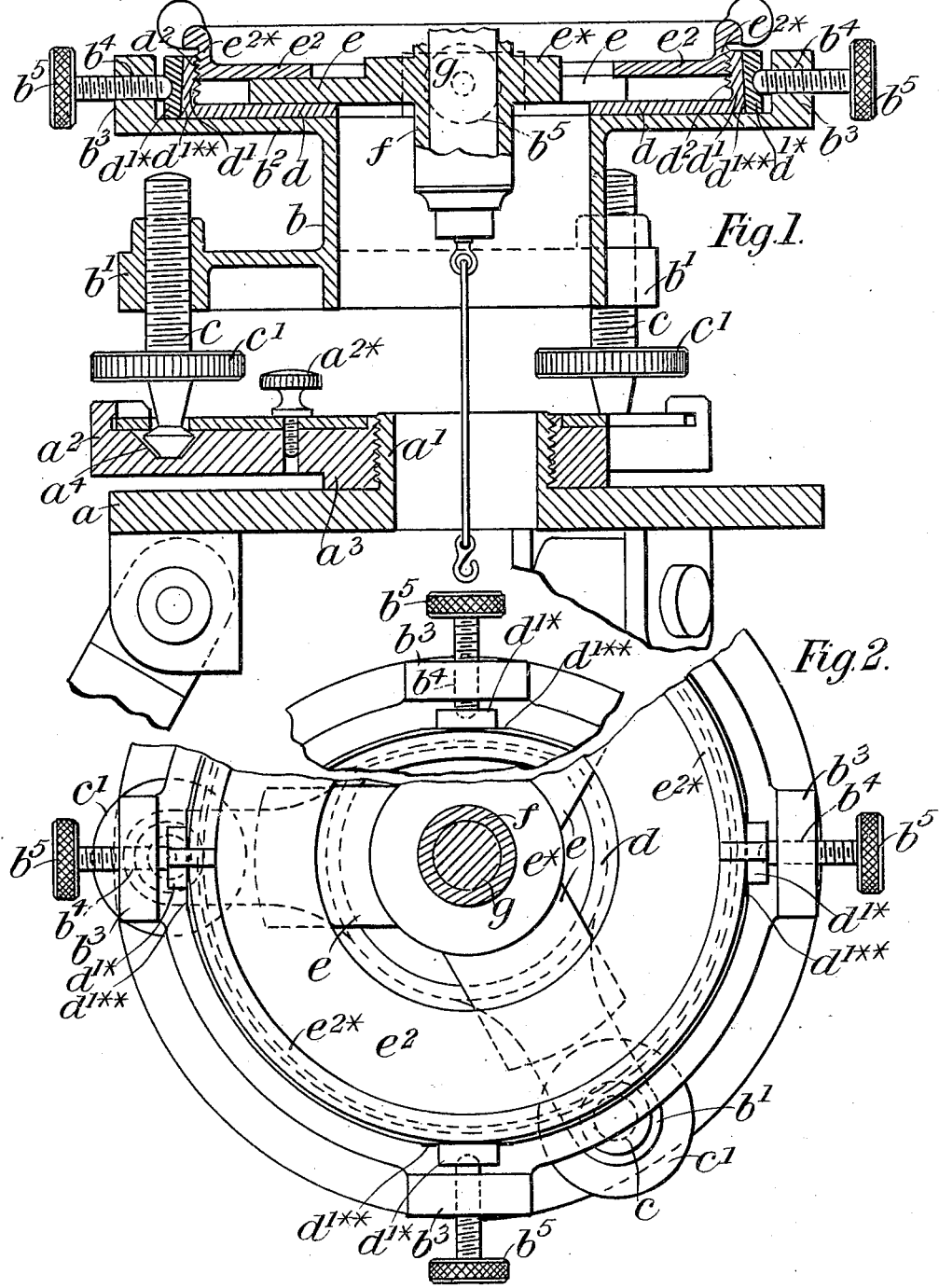

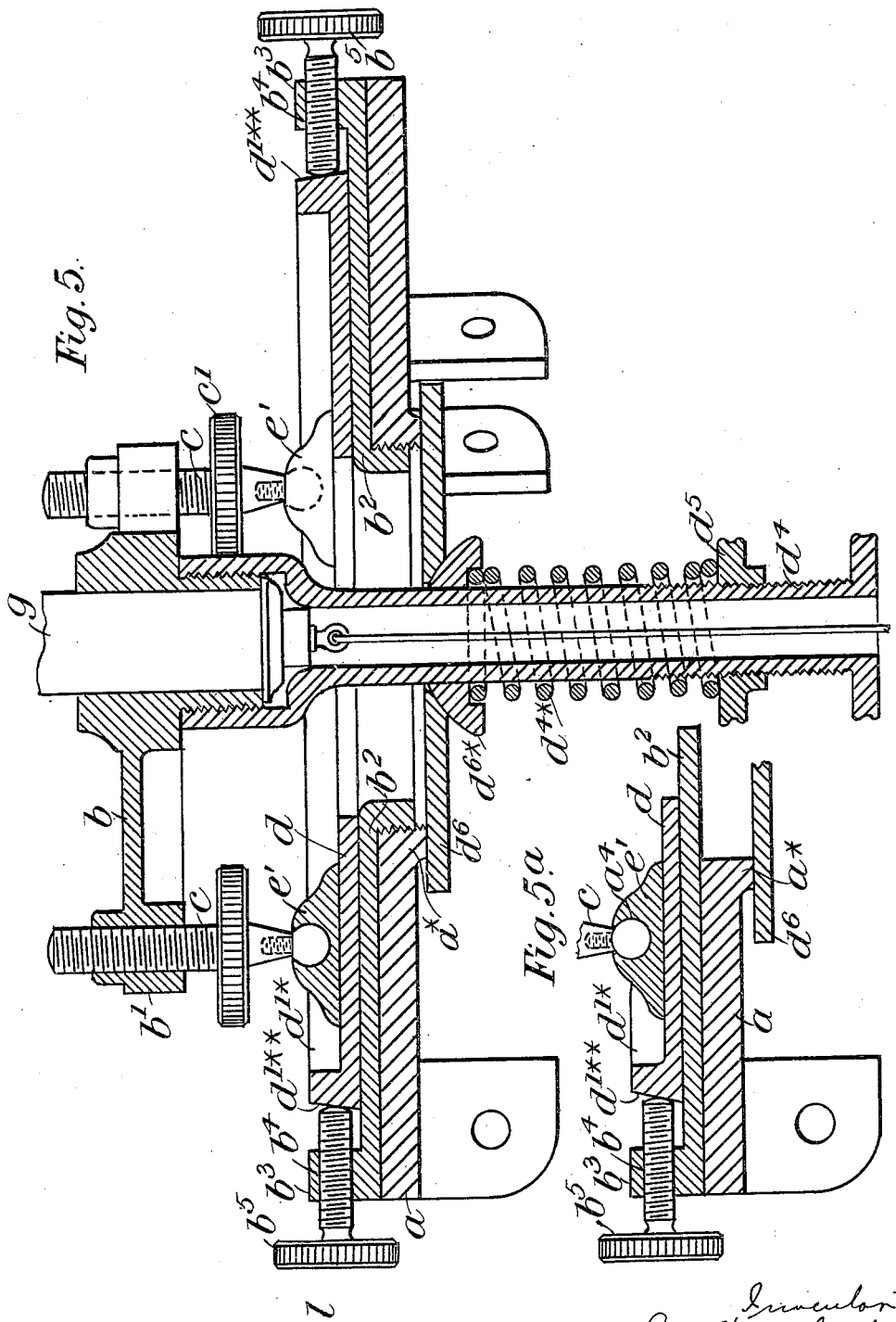

L. H. COOKE.
THEODOLITE, &c.
APPLICATION FILED MAR. 17, 1906.
943,063.
Patented Dec. 14, 1909.
4 SHEETS—SHEET 4.
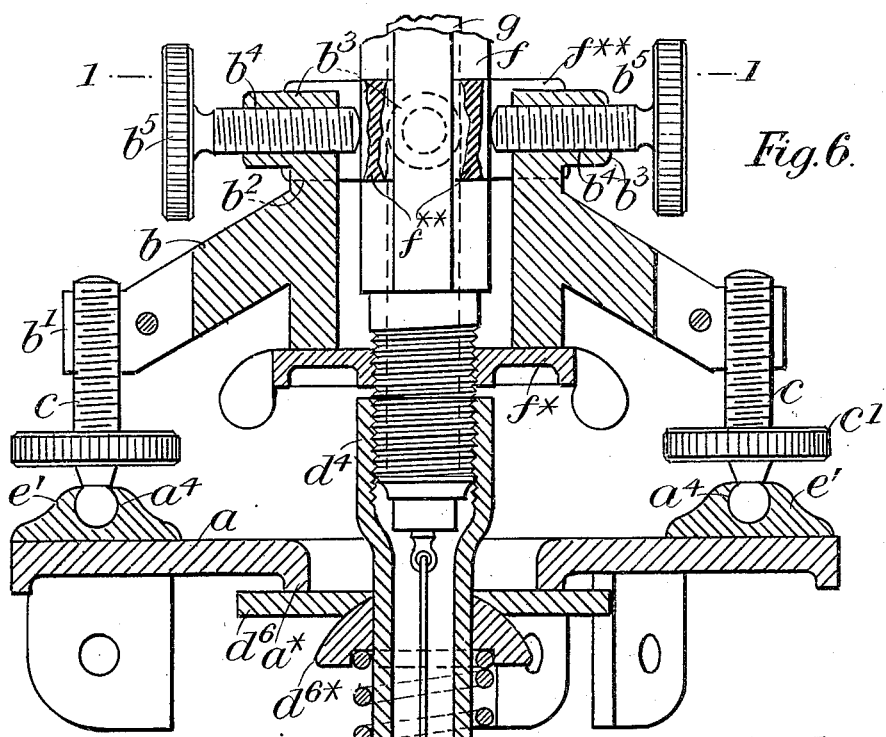
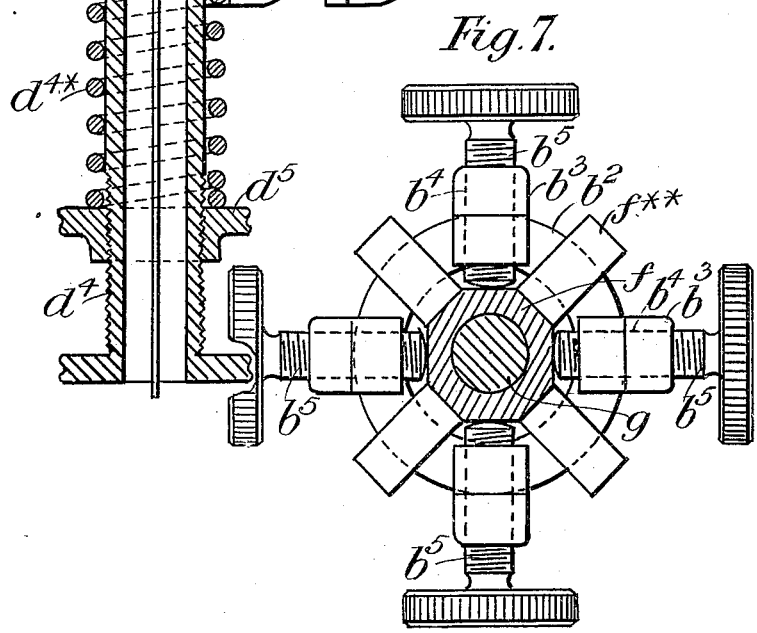
Witnesses
J. M. Wynkoop
H. A. Totten
Inventor
Lewis Henry Cooke
by Knight Bros
Attys

UNITED STATES PATENT OFFICE.

LEWIS HENRY COOKE, OF WIMBLEDON, ENGLAND.

THEODOLITE, &c.

943,063.  Specification of Letters Patent.  Patented Dec. 14, 1909.

Application filed March 17, 1906. Serial No. 306,671.

*To all whom it may concern:*

Be it known that I, LEWIS HENRY COOKE, a subject of the King of Great Britain, residing at 16 Homefield road, Wimbledon, in the county of Surrey, England, mining engineer, have invented certain new and useful Improvements in Theodolites and the Like, of which the following is a specification, reference being had to the drawings hereunto annexed, and to the figures and letters marked thereon—that is to say:

The invention relates to improvements in means for centering theodolites tachometers and other goniometers used for the exact measurement of angles particularly in cases where the distances between the stations are short as in city and mine surveying and where a high degree of precision is necessary.

Hitherto the measurement of such angles has been rendered very tedious by the crude means employed for "centering" that is bringing the vertical axis of the instrument to coincide with the vertical through the station and the object of the present invention is to improve the construction of the instrument in such manner that a greater degree of precision and speed in working is obtained than heretofore.

In the accompanying drawings, Figure 1 is a vertical section of part of a theodolite having the present invention applied thereto. Fig. 2 is a sectional plan thereof. Fig. 3 is a similar view to Fig. 1 illustrating a modification. Fig. 4 is a similar view illustrating a further modification. Fig. 5 is a similar view illustrating a further modification. Fig. 5ª is a similar view of part of the instrument illustrating a further modification. Fig. 6 is a similar view illustrating a still further modification and Fig. 7 is a horizontal section thereof taken on the line 1—1 of Fig. 6.

In the several figures like parts are indicated by similar letters of reference and all the figures are drawn to an equal scale.

Referring to Figs. 1 and 2 in which both the fine and the coarse adjustments are shown to be above the leveling screws of the instrument, $a$ represents the usual table top of the stand or tripod of the instrument which is formed with an exteriorly threaded hollow boss $a'$ and $a^2$ represents an ordinary Everest tribrach stage upon which the leveling screws rest and which is provided with a screw clamp $a^{2*}$, or it might be the usual spring lock. The tribrach stage $a^2$ is provided with the usual interiorly threaded hollow boss $a^3$ adapted to screw onto the boss $a'$ and thus removably fix said stage $a^2$ to the tabular top $a$ of the stand or tripod.

$b$ represents a stage or table formed with brackets $b'$ thereon carrying the usual foot or leveling screws $c$ which stand in the usual V section bearings $a^4$ formed in the stage $a^2$ and which screws are provided with the usual milled buttons $c'$. The stage $b$ is provided with a table $b^2$ having lugs $b^3$ formed with perforations $b^4$ in which work adjusting screws $b^5$. Sliding upon the stage $b$ is a slidable member consisting of an annular stage or table $d$ provided with an upwardly projecting flange $d'$ upon the exterior of which are formed four inclined facets $d'^{**}$ against which abut four blocks $d'^*$ into cups formed in which take the ends of the adjusting screws $b^5$ for centralizing the table $d$ and by reason of the inclination of the facets $d'^{**}$ the table $d$ is prevented rising from the table $b^2$ and this device constitutes the fine "centering" adjustment of the instrument.

Loosely resting upon the top surface of the table $d$ is another slidable member consisting of a plate $e$ which is formed with a tubular boss or socket $f$ in which is mounted the spindle $g$ of the instrument proper and in connection with the plate $e$ is employed an annular plate $e^2$ having an upwardly projecting externally threaded flange $e^{2*}$ on its periphery which screws into an internal thread $d^2$ formed in the stage or table $d$.

When the plate $e^2$ is screwed home it takes a bearing upon the plate $e$ thus clamping the same with the stage or table $d$ and this device constitutes the coarse adjustment of the instrument.

In operation, after leveling, the plate $e^2$ is unscrewed sufficiently to allow the plate $e$ to move freely upon the stage or platform $d$ and said plate $e$ is centered as correctly as possible by hand after which the plate $e^2$ is screwed down thereon thus fixing the same with the platform or table $d$ and the centering is completed by manipulating the adjusting screws $b^5$.

In some cases the simple hand moved slide above the foot screws may suffice without the addition of the fine adjustment. In the example given at Fig. 3 the device hereinbefore described is modified. In this case the coarse and fine adjustments are separated the coarse adjustment being placed below the leveling screws $c$ while the fine adjustment retains its position above. In this embodiment the slidable member for the fine adjustment is formed by a two way slide $d$ of the construction sometimes employed in instruments of this class and which is of a known type is substituted therefor and the table $b^2$ is in this case composed of a skeleton frame provided with ways $b^{2*}$ in which the lower part of the slide $d$ works.

The socket $f$ passes through the upper part of the slide $d$ and follows the movements thereof while the lower part of said slide is provided with an opening to permit the free movement of said socket $f$ with the upper part of the slide and this device constitutes the fine adjustment of the instrument.

The instrument is mounted by means of the usual foot or leveling screws $c$ upon an ordinary Everest tribach stage having the slidable member $e$ for the coarse adjustment mounted upon a plate $a^2$ screwed upon the boss $a'$ of the table $a$ of the stand or tripod and having a boss $a^{2**}$ which is externally threaded at its upper end upon which screws a clamping cap or nut $e^2$.

In the example given at Fig. 4 is illustrated a further modification in the construction of the device in which both the coarse and fine adjustments of the instrument are arranged below the leveling or foot screws. In this case the table $a$ is dispensed with and the table $b^2$ is fixed directly upon the top of the stand or tripod while the slidable member for the fine adjustment consisting of the plate or stage $d$ is formed of two plates the lower one of which is provided with a flange $d^*$ around its edge upon which the other plate is fixed thus leaving a recess $d^{*\prime}$ between the two plates in which slides the slidable member for the coarse adjustment consisting of the plate $e$.

The coarse adjustment plate $e$ is formed with a tubular boss or socket $e^3$ and the main socket $f$ of the instrument is provided at its lower end with a ball or enlargement $f'$. The socket $e^3$ of the plate $e$ is formed at its upper end with an inwardly projecting flange $e^{3*}$ provided with a curved seating for the ball or enlargement $f'$ of the socket $f$ thus forming a ball and socket connection with the plate $d$. The socket $f$ is formed with arms $f^2$ carrying the leveling screws $c$ the lower ends of which work in step bearings $a^4$ which in this case are upon the upper part of the stage or platform $d$. The clamping is effected by means of the leveling screws $c$ which can be employed to lift up the socket $f$ and the ball $f'$. The upward pull of the ball $f'$ upon the socket $e^3$ causes the plate $e$ to bear against the underside of the upper plate of the fine adjustment stage $d$ with some degree of force and thus automatically holds said plate $e$ in any position to which it may have been adjusted.

In order to prevent the accidental upward displacement of the stage $d$ the periphery thereof is formed with inclined flats or facets $d'^{**}$ which are acted upon by the ends of the adjusting screws $b^5$ and in order to clamp the fine adjustment in the position to which it has been set the stage $d$ is furnished with a downwardly projecting tubular boss $d^4$ which at its lower end is externally threaded and provided with a nut $d^5$ which screws home upon the boss $d^4$ against a washer $d^6$ which takes a bearing against the underside of the table $b^2$.

Before the fine "centering" operation is commenced the nut $d^5$ must be unscrewed to release the stage or platform $d$ and after the "centering" operation has been performed said nut is screwed up again.

In the example given at Fig. 5 is illustrated a further modification. The coarse adjustment plate $e$ in this case is dispensed with and the slidable member for the coarse adjustment which is formed by the stage $b$ is supported by the leveling screws $c$ upon feet $e'$ adapted to slide loosely upon the slidable member for the fine adjustment which is formed by the tabular top or platform $d$ of the tripod. In order to prevent the stage $b$ sliding about the table $d$ indiscriminately and to keep the same under control the socket $f$ of the compound centers $g$ which is combined with the stage $b$ has screwed thereon or otherwise fixed therewith a hollow bolt or stem $d^4$ which projects downwardly some distance below the table $a$ of the stand or tripod. Embracing this hollow bolt $d^4$ is a spring $d^{4*}$ which at its lower end takes an abutment against a nut $d^5$ screwing upon a threaded part of the bolt $d^4$ and at its upper end abuts against a washer $d^{6*}$ which bears against a plate $d^6$ which in turn bears against a flange $a^*$ upon the underside of the table $a$. By these means all the movable parts are simultaneously clamped and the feet $e'$ are frictionally caused to remain in any position to which they are adjusted.

If desired the motion of the feet $e$ may be very restricted and the coarse adjustment obtained by sliding the plate $b^2$ upon the table $a$ by hand and the fine adjustment obtained by means of the adjusting screws $b^5$ as indicated in Fig. 5ª. In other respects however the device is similar to those hereinbefore described.

In the example given at Figs. 6 and 7 the table $b^2$ and the fine adjustment platform $d$ are dispensed with and the lower ends of the leveling screws $c$ which support the slidable member or stage $b$ impinge and slide directly upon the table $a$ of the stand or tripod of the instrument to obtain the coarse adjustment and in order to obtain the fine adjustment the stage $b$ is provided with lugs having threaded perforations $b^4$ and the adjusting screws $b^5$ work in said perforations and impinge directly upon the socket $f$ of the instrument which latter is provided with arms $f^{**}$ which rest and slide upon the upper end of the stage $b$ and form the slidable member for the fine adjustment. The means for controlling the movement of the coarse adjustment is identical with that lastly hereinbefore shown and described with the exception that the lower end of the spindle socket $f$ of the instrument is threaded and the tubular extension thereof $d^4$ is internally threaded and screwed thereonto while in order to more firmly clamp the spindle socket $f$ against movement after the fine "centering" operation has been completed a nut $f^*$ screwing upon said socket $f$ and taking a bearing against the underside of the stage $b$ is provided to co-act with the arms $f^{**}$. In other respects the device is similar to that lastly hereinbefore described.

It will be obvious that the details of construction of the device may be further modified without departing from the spirit of the invention.

By the means hereinbefore described an instrument is obtained which gives a greater degree of precision than heretofore and greater speed in working in the ordinary way while in cases of exceptionally short lines or drafts the increase of speed facilitates repeated centering and angular measurements furnishing thereby a more exact average value and further by "centering" upon the reversal principle allowing of the elimination of the instrumental error of the centering mark.

Having now particularly described and ascertained the nature of the said invention and in what manner the same is to be performed I declare that what I claim is:—

1. In an instrument of the character described; the combination with the tripod; of two members slidable relatively to each other and to the tripod; a spindle-socket carried by one of said members; and means for simultaneously clamping the several parts together.

2. In an instrument of the character described, the combination with the tripod having a tabular top provided with a central aperture; of a hollow member extending through said aperture; means connected with said hollow member for clamping it resiliently to said tabular top; and a spindle-socket carried by said hollow member.

3. In an instrument of the character described the combination of the socket, the slidable member carrying the socket, a second slidable member on which the socket carrying member moves, one of said members being horizontally shiftable to roughly "center" the instrument, and the other member being horizontally shiftable to effect a fine adjustment of the instrument, and means for simultaneously clamping said movable parts.

4. In an instrument of the character described, the combination of the tripod having a tabular top, the spindle and its socket, a hollow bolt attached to the socket of the spindle, a sliding plate loosely mounted on the hollow bolt and bearing against the underside of the tabular top of the tripod, an adjustable nut at the lower end of said bolt, a loose washer upon the bolt, and a spring abutting against the nut and pressing against the washer.

5. In an instrument of the character described, the combination of the tripod having a tabular top, the socket carrying the spindle, the slidable member carrying the socket, a second slidable member on which the socket carrying member moves, one of said members being horizontally shiftable to roughly "center" the instrument and the other member being horizontally shiftable to effect a fine adjustment of the instrument, and means for simultaneously clamping said movable parts; said means consisting of a hollow bolt attached to the socket of the spindle, a sliding plate loosely mounted on the hollow bolt and bearing against the underside of the tabular top of the tripod, an adjustable nut at the lower end of said bolt, a loose washer upon the bolt and a spring abutting against the nut and pressing against the washer.

6. In a theodolite, the combination with the rigidly held top-plate of a tripod; of a member slidable thereon; a second member slidable on said first member; a socket carried by said second member; a spindle mounted in said socket, said spindle being provided with a depending plumb-bob wire; and a hollow member secured to said spindle-socket and inclosing said wire, said member having adjustable means for clamping said top-plate.

In witness whereof I have hereunto set my hand in the presence of two witnesses.

LEWIS HENRY COOKE.

Witnesses:
C. MELBOURNE WHITE,
C. H. WHITE.